Aug. 28, 1962 R. S. HINSEY 3,051,015
MECHANISM CONTROL
Filed June 28, 1956 4 Sheets-Sheet 2
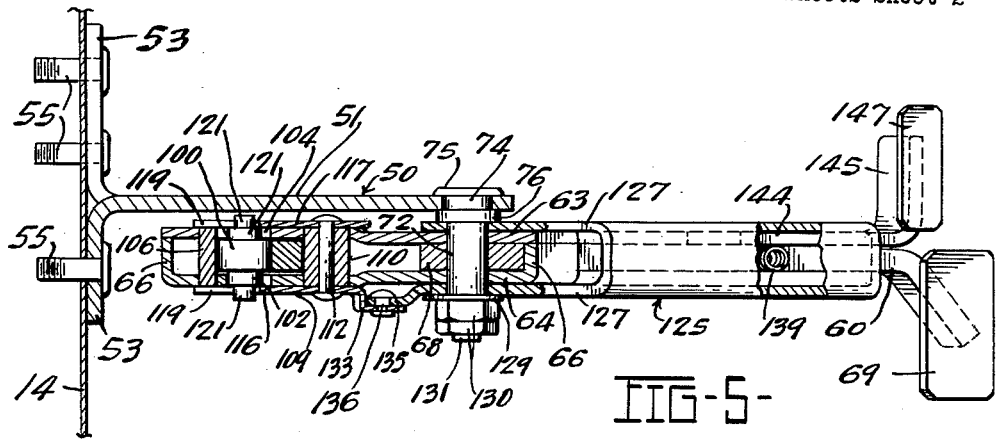
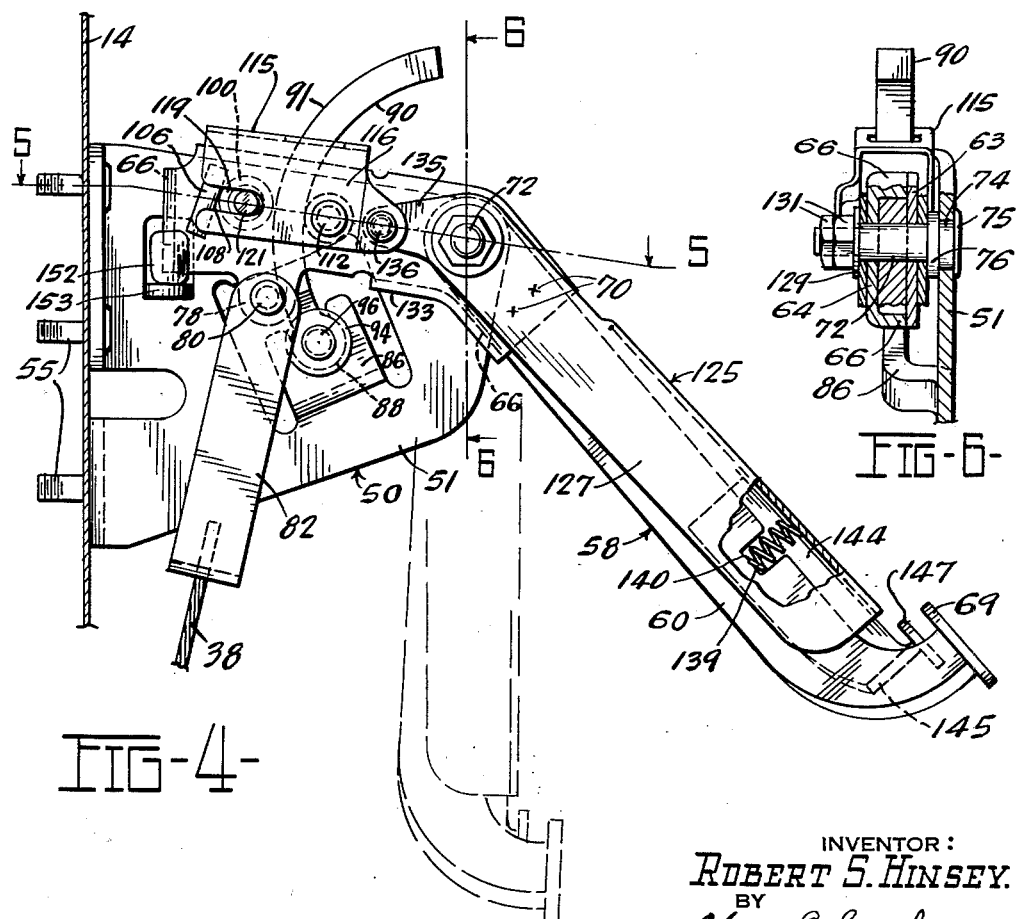
INVENTOR:
ROBERT S. HINSEY.
BY
Harry O. Ernsberger
ATTORNEY Aug. 28, 1962     R. S. HINSEY     3,051,015
MECHANISM CONTROL
Filed June 28, 1956     4 Sheets-Sheet 3
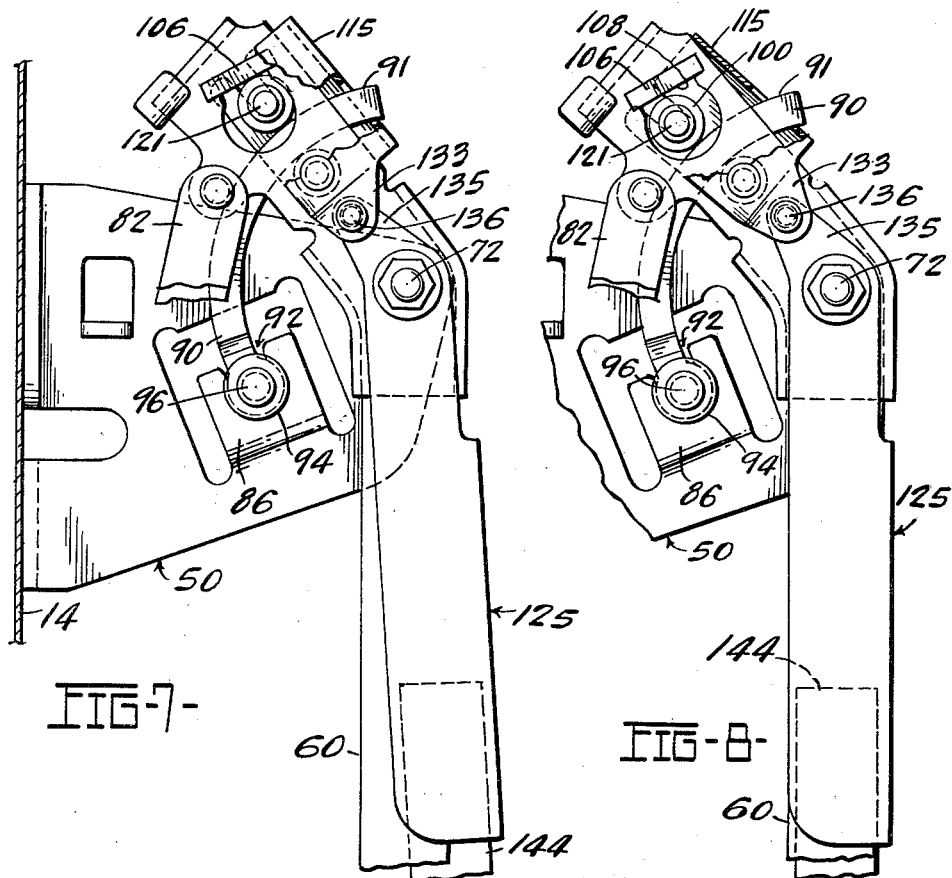
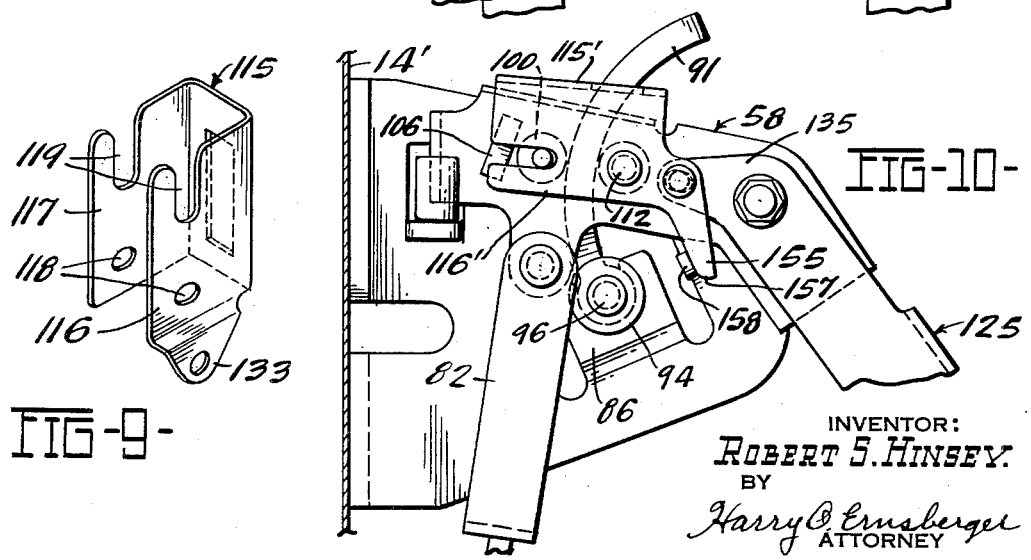
INVENTOR:
ROBERT S. HINSEY.
BY
Harry O. Ernsberger
ATTORNEY

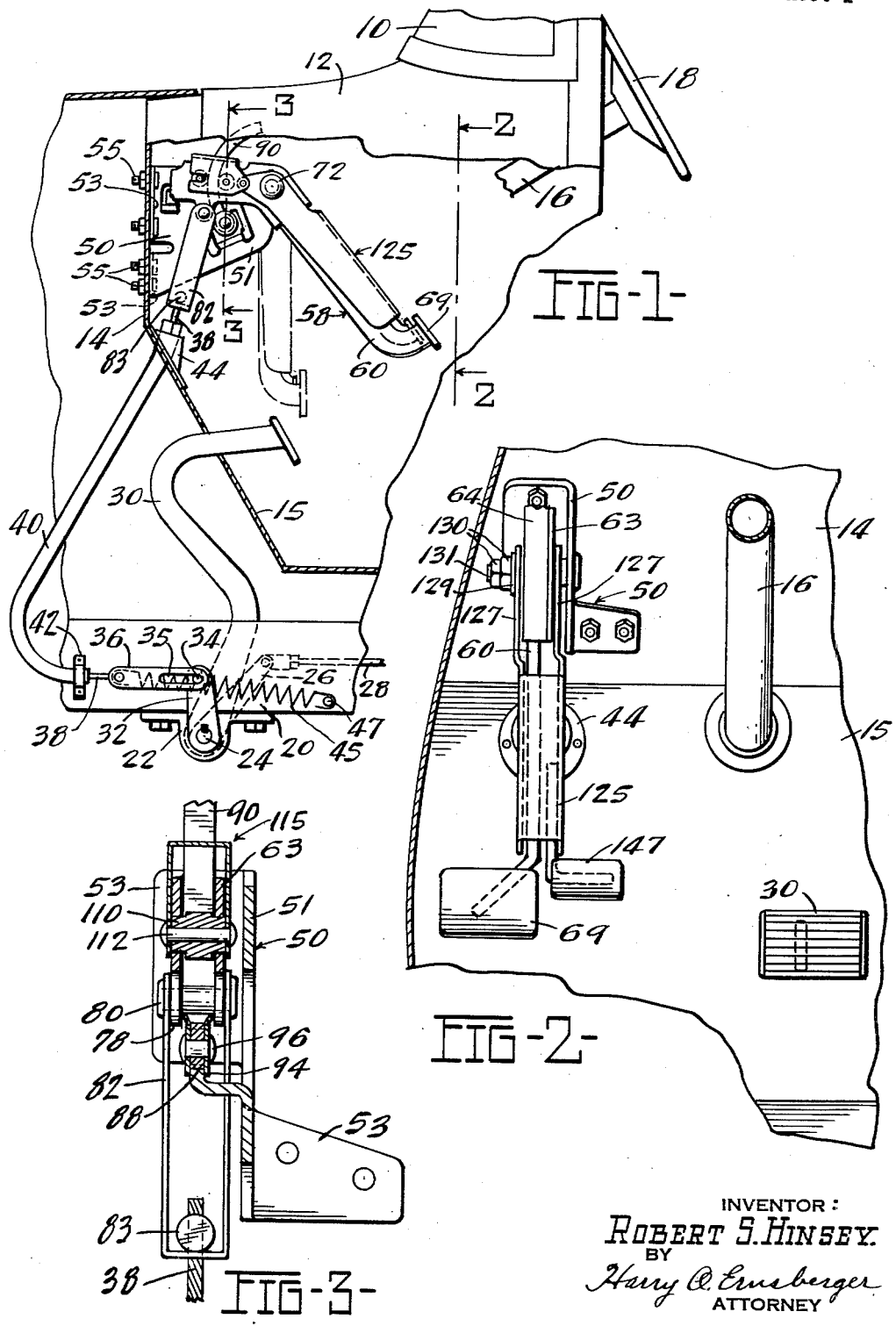

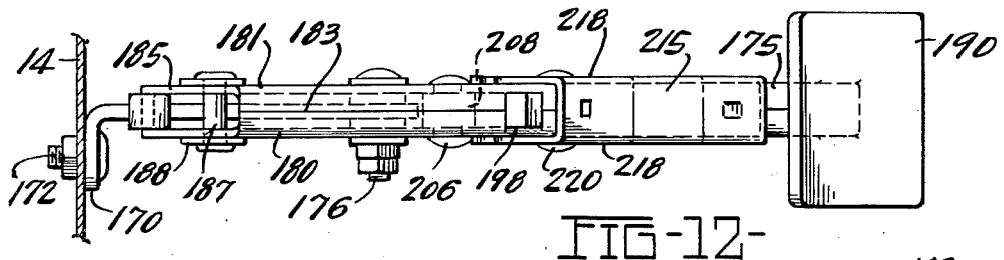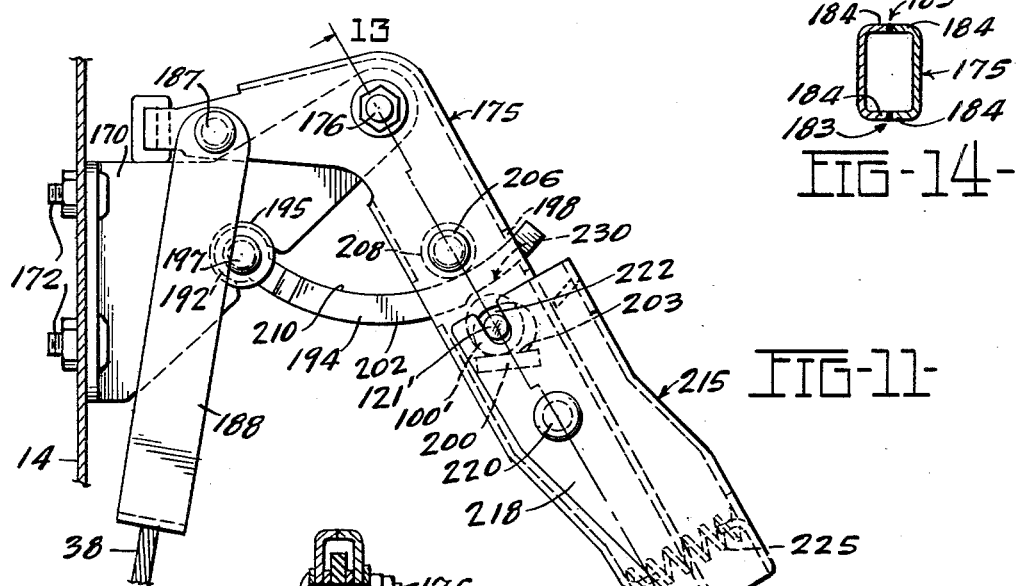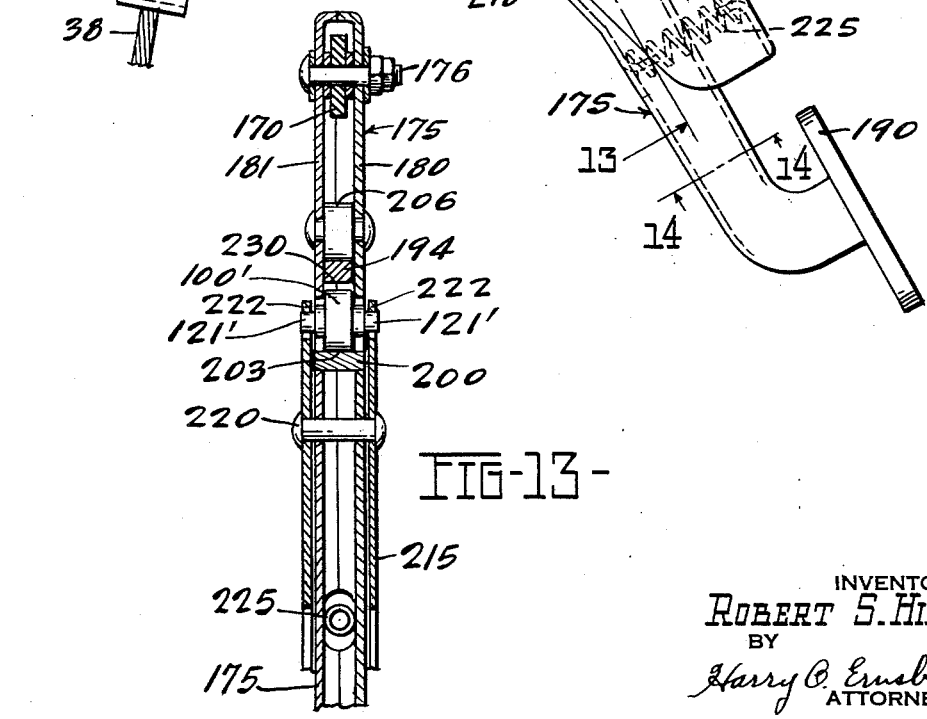

United States Patent Office 3,051,015
Patented Aug. 28, 1962

3,051,015
MECHANISM CONTROL
Robert S. Hinsey, Toledo, Ohio, assignor, by mesne assignments, to Van Norman Industries, Inc.
Filed June 28, 1956, Ser. No. 594,595
6 Claims. (Cl. 74—529)

This invention relates to mechanism control and more especially to means or mechanism for actuating or controlling the parking or emergency brakes of a vehicle.

The invention embraces a foot operated lever or lever construction in combination with lever retaining means operable to hold the lever or lever construction in adjusted or brake setting position and embodying a means adapted to be foot operated for releasing the lever retaining means.

An object of the invention is the provision of a foot operated brake actuator mounted so as to be connected with a sheathed brake cable having a minimum curvature whereby friction between the cable and sheath is greatly reduced thereby requiring less effort or force to operate the vehicle parking or emergency brake.

An object of the invention resides in a foot operated lever arrangement embodying a lever retaining means for holding the lever arrangement in adjusted positions in combination with means articulated with respect to the lever arrangement and carried thereby for effecting a release of the retaining means.

Another object of the invention is the provision of a foot operated lever adapted to actuate or control the parking brakes of a vehicle, the arrangement embodying friction means for retaining the lever in various brake setting positions in conjunction with a foot operated release member for the friction means carried by the lever and normally resiliently biased in a direction urging the friction means into operative or lever retaining position.

Another object of the invention is the provision of a foot operated lever arrangement and means for retaining the lever arrangement in adjusted positions, the arrangement including a release member and means whereby the lever retaining means is ineffective in a limited region of movement of the lever in the region of its initial or normal position.

Further objects and advantages are within the scope and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view partly in section showing a portion of an operator's compartment of a vehicle showing a form of mechanism control of my invention embodied in the vehicle;

FIGURE 2 is a view taken in the direction of the line 2—2 of FIGURE 1;

FIGURE 3 is a detail sectional view taken substantially on the line 3—3 of FIGURE 1;

FIGURE 4 is a side elevational view of the lever construction shown in FIGURE 1;

FIGURE 5 is a sectional view taken substantially on the line 5—5 of FIGURE 4;

FIGURE 6 is a fragmentary sectional view taken substantially on the line 6—6 of FIGURE 4;

FIGURE 7 is a side elevational view of a portion of the mechanism control in brake-setting position with the clutch means in lever retaining position;

FIGURE 8 is a view similar to FIGURE 7 showing the clutch means and control therefor in clutch released position;

FIGURE 9 is an isometric view of one of the elements of the clutch controlling mechanism;

FIGURE 10 is an elevational view showing a modified form of means for controlling the lever retaining means;

FIGURE 11 is a side elevational view illustrating a modified form of the mechanism control of my invention;

FIGURE 12 is a top plan view of the construction shown in FIGURE 11;

FIGURE 13 is a view taken substantially on the line 12—12 of FIGURE 10, and

FIGURE 14 is a sectional view taken substantially on the line 14—14 of FIGURE 11.

While I have illustrated the forms of control mechanism of my invention as particularly adapted for installation in a vehicle and utilized for actuating or controlling the emergency or parking brakes, it is to be understood that I contemplate the incorporation of my invention with any apparatus or mechanism where it may be found to have utility.

Referring to the drawings in detail, and initially to FIGURE 1, there is illustrated a portion of a vehicle adjacent the operator's compartment. The portion of the vehicle shown is inclusive of a windshield 10, a cowl portion 12, a dashboard or firewall 14, a toeboard 15 and steering post 16 upon the upper end of which is mounted a steering wheel 18. A portion of the chassis frame of the vehicle is illustrated at 20. Secured to the chassis frame 20 are brackets 22, one of which is shown in FIGURE 1.

Journalled upon the brackets 22 is a transversely extending shaft 24 and fixedly secured to the shaft is an arm 26 connected by means of a rod 28 or other suitable means with brake mechanism arranged adjacent and operative upon the road wheels (not shown) of the vehicle. Also mounted upon the shaft 24 is a pedal 30 which is connected to the service brakes of the vehicle either through the shaft 24 or by other means (not shown). As illustrated in FIGURE 1 the pedal 30 is arranged to rotate the shaft 24 and actuate the brake rod 28 but it is to be understood that the service brake pedal 30 may operate the vehicle brakes through hydraulic means of other suitable mechanism.

Keyed or otherwise supported upon the shaft 24 is an arm 32 provided at its distal end with a pin or stub shaft 34 adapted or arranged for traverse in a slot 35 formed in a member 36. An end of the member 36 is connected with a flexible cable 38 slidably enclosed within a sheath or tubular guide 40. The end of the sheath 40 adjacent member 36 is secured to the frame 20 by means of a clip or bracket 42.

The opposite end of the sheath 40 extends through an opening in the toeboard 15 and through a weather-tight fitting 44 supported by the toeboard. One end of a contractile coil spring 45 is secured to the member 36, the opposite end being engaged with a pin 47 carried by the chassis frame 20. The spring 45 normally urges or biases the member 36 in a right-hand direction as viewed in FIGURE 1. The pin and slot arrangement 34, 35 provides a lost motion connection whereby the pedal 30 may be depressed, swinging the arm 32 in a counter-clockwise direction without affecting relative movement of the member 36 when the pedal 30 is utilized to actuate the vehicle brakes.

The mechanism control is inclusive of a support 50 having a uniplanar portion 51 and transversely extending ear portions or flanges 53, the latter being secured to the dashboard 14 by means of bolts 55. The lever or lever construction 58 is articulately or pivotally carried by the uniplanar portion 51 of the support 50.

The lever construction 58 includes mating sections 63 and 64 formed of sheet metal, the section 64 being formed with a transversely extending flange 66, the edge zones of which engage the section 63 as shown in FIGURES 5 and 6 and are welded thereto in order to form an integral unit. The body portions of sections 63 and 64 are in spaced relation and a component or member 60 of the lever construction has an upper zone snugly fitting between the sections 63 and 64 and is welded to the sections as indicated at 70. In this manner the sections 63, 64 and the bar or member 60 form an integrated lever unit or member. The bar 60 is provided at its lower end with a foot pad portion 69.

The sections 63, 64 and the bar 60 are formed with aligned openings to receive a cylindrically shaped pin or stub shaft 72. The pin 72 is formed with a cylindrical portion 74 which is received in an opening formed in the uniplanar portion 51 of the support, a projecting portion of the pin 72 being swaged to form a head or abutment 75 for securing the pin to the support, the pin forming a fulcrum or pivotal axis for the lever construction. The pin 72 is formed with a flange 76 functioning to space the lever assemblage from the support 50.

The lever sections 63 and 64 are provided with depending portions 78 having aligned openings to receive a clevis pin 80 for pivotally connecting a clevis 82 to the lever sections in the manner particularly illustrated in FIGURES 1, 4 and 5. The clevis 82 is connected by means of a retaining member 83 with the upper end zone of the flexible cable 38 whereby the lever construction 58 is operatively connected with the vehicle parking or emergency brake mechanism.

The uniplanar portion 51 of the support is formed with a laterally offset portion 86 which is formed with a circular opening adapted to receive a circular end or head portion 88 formed at one end of a member or arcuately shaped arm 90 which forms a component of means for retaining the lever in adjusted or brake setting positions. The opening in portion 86 accommodating the head 88 is formed with a restricted throat 92 whereby the circular head 88 is held in the opening in portion 86 providing for limited pivotal movement of the arm 90, the restricted throat, however, preventing disengagement of the arm from the portion 86 in the direction of curvature of the arm.

As shown in FIGURES 4, 7 and 8, disks or washers 94 are disposed at opposite sides of the offset portion 86 and are held in place by means of a rivet 96 to prevent lateral displacement of the arm 90 with respect to the support. The curved surfaces of the arm 90 are generated as arcs about the axis of the stub shaft 72 which form the fulcrum or pivotal axis for the lever construction 58.

Associated with the lever sections 63 and 64 is a lever retaining means or clutch member 100 which, in the embodiment illustrated, is in the form of a roller. The roller 100 is formed with shoulder portions or tenons 102 which extend into suitable clearance openings 104 formed in the lever sections 63 and 64. The roller 100 is adapted for cooperation with the arcuate or clutching surface 91 of the bar 90.

As shown in FIGURE 4, the end regions of the lever sections 63 and 64 are formed with transversely aligned rectangular openings to accommodate a rectangularly shaped block or member 106 which has a surface 108 angularly arranged with respect to the arcuate surface 91 of the bar 90 so as to provide two generally converging surfaces 91 and 108 between which the roller 100 is disposed, the surfaces forming a wedging angle to frictionally hold the clutch member or roller 100 and hence the lever construction 58 in brake setting positions. The rectangularly shaped member 106 is hardened and may if desired be welded to the lever sections 63 and 64.

The lever sections 63 and 64 are formed with transversely aligned circular openings to accommodate a circular cylindrically shaped abutment or sleeve 110, the periphery of which engages the lower arcuate surface of the bar 90 forming a thrust member or abutment for the component 90 of the clutch or lever retaining arrangement. A rivet or stub shaft 112 extends through the abutment 110 as particularly shown in FIGURE 5.

The arrangement includes means for controlling the clutch or lever retaining arrangement to effect a release of the lever retaining means to release the brakes. As particularly shown in FIGURES 4, 5 and 9, a U-shaped member 115 is formed with parallel wall portions 116 and 117 which straddle the assembly of lever sections 63 and 64. The walls 116 and 117 are provided with registering openings 118 to receive the rivet or stub shaft 112 whereby the member 115 is mounted for pivotal movement relative to the lever sections about the axis of the rivet or pivot member 112.

The walls 116 and 117 are provided with slots 119 defined by edge walls which are substantially parallel and are spaced to snugly yet slidably accommodate cylindrically shaped tenons 121 formed on the clutch roller 100. Pivotal movement of the U-shaped clutch actuating and controlling element 115 moves the lever retaining means 100 into effective or ineffective positions.

The member 115 is connected with a clutch actuating or controlling means or supplemental lever 125 which is mounted for articulate or pivotal movement relative to the lever assembly 58.

As particularly shown in FIGURES 4 and 5, the member 125 is of U-shaped configuration in cross section having parallel walls 127 which straddle the lever member or bar 60. The side walls 127 are formed with aligned openings adapted to receive the stub shaft 72 whereby the member 125 is movable relative to the lever 58. A washer or disk 129 and securing nuts 130, the latter being threaded upon a portion 131 of the shaft 72, serve to hold the lever bar 60, lever sections 63, 64 and clutch manipulating means or supplemental lever 125 in assembled relation as shown in FIGURE 5.

A projection 133 formed on member 115 and a projection or extension 135 formed on the manipulating member 125 are arranged in overlapping relation and are joined together by means of a rivet 136. The opening in one of said projections is slightly larger than the portion of the rivet 136 extending therethrough in order to compensate for the relatively slight arcuate movements of the axis of the openings accommodating the rivet 136 during pivotal movements of members 115 and 125.

A resilient means in the form of an expansive coil spring 139 is interposed between the bight portion of the manipulating member 125 and the bar or component 60, there being a recess or socket 140 formed in the lever bar in order to prevent displacement of the spring 139. From FIGURE 4 it will be apparent that the expansive coil spring 139 is operative through the connection with member 115 urging or biasing the latter in a clockwise direction about the axis of the rivet 112 thereby biasing the clutch roller 100 into effective wedging or lever retaining position between the surface 91 of the curved bar 90 and the surface 108 of the member 106.

The manipulating means for the clutch member is provided with a laterally offset element to facilitate foot operation of the release means. Welded or otherwise secured to the surface of one of the side walls of member 125 is a plate 144 which has a portion 145 extending transversely of the member 125, the portion 145 being provided or equipped with a toe or foot pad section 147. As will be seen from FIGURES 4 and 5, the clutch or lever retaining means may be moved to release position by foot pressure applied either upon the exterior surface of the bight portion of member 125 or the pad 147.

As particularly shown in FIGURE 4, the upper end of the lever 58 is equipped with a cushion or bumper member 152 formed of rubber or similar yieldable nonmetallic material arranged to engage a projection or ledge 153 when the lever is in brake release position. The bumper member 152 absorbs or cushions the impact or return movement of the lever to brake release position.

The operation of the arrangement shown in FIGURES 1 through 9 is as follows: The brake actuating lever arrangement is shown in brake release position in FIGURES 1, 2 and 4. In this position, the spring 45 has retracted the brake actuating cable 38 and associated elements to the position illustrated in FIGURE 1. In order to set the emergency or parking brakes of the vehicle, the operator, by foot pressure applied on the foot pad 69, rotates the lever construction 58 in a clockwise direction as viewed in FIGURE 1 about the axis of the fulcrum pin 72. As the clutch roller 100 is normally biased into a wedging engagement between the rectangularly shaped member 106 and the arcuate bar 90 under the influence of the expansive coil spring 139, the clutch roller is continuously urged into clutching or lever retaining position.

When movement of the lever construction through the medium of the cable 38 has drawn up or acted upon the brakes to set them, the clutch 100 is wedged between the member 106 and the arm 90 to hold the vehicle brakes and the lever construction 58 in brake setting position, this position being illustrated in FIGURE 7.

When is is desired to release the vehicle brakes, the operator by applying foot pressure either to the bight portion of the clutch control member 125 or the toe pad 147 moves the control member 125 about the pivotal support 72 which in turn causes pivotal movement of member 115 in a counter clockwise direction as viewed in FIGURES 4 and 8 to withdraw the clutch roller 100 from wedging engagement between the block 106 and the arm 90. This relative position of the clutch roller 100, the clutch control or manipulating member 125, block 106 and arm 90 are illustrated in FIGURE 8 in clutch releasing position. With the clutch in released position, the brake retracting spring 45, through the medium of the flexible cable 38, moves the lever arrangement 58 in a counter clockwise direction, as viewed in FIGURE 1, to brake release position. It should be noted that the spring 139 continuously biases the clutch roller 100 toward lever retaining position through the medium of the members 115 and 125.

FIGURE 10 illustrates a means that may be provided for holding the lever retaining means or clutch in an ineffective position for a limited range of movement of the lever 58 adjacent brake-release position. During the normal clutch releasing operation, the member 125 is depressed by pressure on the foot pad 147 and under the influence of the retractile spring 45 the lever 58 and the release member 125 swings in a counter clockwise direction as viewed in FIGURE 4 while the operator exerts sufficient pressure upon the foot pad 147 to release the clutch 100.

Should the operator prematurely withdraw foot pressure from the pad 147 of the clutch release mechanism before the lever 58 has fully returned to its release position, the clutch means may engage and hold the brake mechanism in a partially brake-set condition. The arrangement shown in FIGURE 10 embodies means for automatically moving the clutch 100 to an ineffective position as the lever 58 approaches brake-release position.

The wall 116' of member 115' is formed with a projection or cam 155 having a cam surface 157 adapted to engage a projection 158 which may be formed as an integral lateral extension or ear portion of the support or bracket 50 or it may be in the form of a pin or abutment carried by the bracket. The contour of the cam surface 157 is such that through a limited range of movement of the lever 58 adjacent brake release position, the cam surface 157 engages the pin or abutment 158, swinging the clutch control member 115' in a counter clockwise direction about its pivotal support 112.

In this manner the clutch roller 100 is moved out of clutching engagement with the arcuate arm 91 and the plate 106, as shown in FIGURE 10, and is held in release position for the remainder of movement of the lever 58 toward full brake release position. The range of arcuate movement of the foot pad portion 69 of the lever during which the clutch roller is held in ineffective position may be from one-half inch to one and one-half inches depending upon the particular installation and the length of the power arm of the lever 58.

Thus if the operator should inadvertently remove foot pressure from the release member 125 as the lever approaches brake release position but before it has reached full brake release position, the cam member 155, engaging the abutment or pin 158, moves the clutch roller 100 to a release position so as to enable complete release of the lever 58 to normal release position. The range of unimpeded movement of the lever is limited adjacent brake release position so as not to impair the effectiveness of the clutch means when the lever approaches normal break setting positions.

FIGURES 11 through 14 illustrate a modified form of lever retaining means and controlling mechanism therefor. In this arrangement a support or bracket 170, which may be secured to the fire wall 14 of the vehicle by means of rivets 172, is adapted to support a lever or lever construction 175, the latter being fulcrumed or pivotally supported upon a stub shaft 176 extending through an opening formed in the support 170.

The lever construction 175 in this form of the invention may be fashioned of two similarly shaped matched sheet metal sections 180 and 181. The sections 180 and 181 are shaped or fashioned with inwardly extending flanges which abut or meet as indicated at 183, the abutting flanges being welded or otherwise secured together. The projecting wall portions 185 at the upper end zone of the pedal lever construction are formed with aligned openings receiving a rivet 187 which pivotally connects a clevis 188 with the lever.

The clevis is arranged to be connected with the brake operating cable 38. The lower extremity of the lever construction 75 is provided with a foot pad portion 190 to facilitate foot actuation of the lever arrangement. The bracket or support 170 is formed with a circular opening to receive a circular head portion 192 integrally formed upon the end of an arcuately shaped bar 194. The head portion 192 is prevented from lateral displacement relative to the support 170 by means of washers or disks 195 held in place at each side of the support by means of a rivet 197.

The inwardly extending flanges 184 of the lever sections are formed with openings 198 to accommodate the arcuately shaped bar 194. The side walls of the lever sections are formed with aligned rectangularly shaped openings in which is snugly fitted a rectangularly shaped block 200 forming a component of the lever retaining mechanism.

Disposed between the lower arcuate surface 202 of the bar 194 and the surface 203 of the block 200 is a lever retaining member in the form of a clutch roller 100' which is similar to the lever retaining member 100 shown in FIGURES 4 and 5. The lever sections are also formed with openings to receive a rivet or stub shaft 206 upon which is supported a cylindrical sleeve or member 208 forming an abutment or thrust member adapted for engagement with the curved surface 210 of the bar 194.

It will be obvious from FIGURE 10 that the clutch roller 100' is arranged for wedging engagement between the generally converging surfaces 202 and 203 formed respectively on the bar 194 and the block 200, serving to hold the lever construction and brake operating cable 38 in various brake setting positions.

Means is provided articulately supported upon the lever for controlling the position of the clutch roller or lever retaining means 100'. The clutch controlling means is inclusive of a member 215 generally of U-shape in cross-section, the side walls 218 thereof being arranged to straddle the lever 175. The side walls 218 of the control member 215 and the walls of the lever 175 are formed with registering openings adapted to receive a rivet or stub shaft 220 whereby member 215 is pivotally supported on the lever 175.

As particularly shown in FIGURE 10 an end region of member 215 is formed with slots 222 which snugly yet freely receive tenons 121' formed on the clutch roller 100'. A resilient means in the form of an expansive coil spring 225 is disposed between the bight portion of member 215 and a lower wall of the lever 175 tending to normally bias the member 215 in a counter clockwise direction about the axis of the fulcrum or pivot shaft 220 as viewed in FIGURE 10. The biasing action of the spring 225 urges the lever retaining means or clutch member 100' toward lever retaining position. The clutch controlling member 215 may be provided with a laterally extending foot pad portion similar to the pad portion 147 shown in FIGURE 5.

The form of the invention in FIGURES 10 through 12 may be fashioned with means for effecting a release of the clutch or lever retaining means in a limited range of movement of the lever 175 adjant brake release position. The bar 194 is formed with a recess or portion of reduced section defined by a surface 230 as shown in FIGURE 10. The recess defined by the surface 230 relieves the clutch roller 100' from engagement with the bar 194 throughout movement of the lever until the clutch roller is brought into the region of the clutch surface 202 of the bar 194.

The zone of the recess defined by the surface 198 provides for free movement of the lever in an amount of from about one-half inch to one and one-half inches of linear travel of the foot pad 190 on the lever. The extent of movement of the lever with the clutch roller in ineffective position is dependent upon the length of recess in the bar 194 from the terminus of surface 202 to a plane through the axis of the roller 100' normal to the surface 202. The amount of unobstructed movement of the lever in the region of brake release position may be varied depending upon the character of the installation and the length of the power arm of the lever.

It should be noted that in the forms of the invention disclosed, the load arm of the lever viz. the region of the lever between the fulcrum or pivotal support and the clevis connection is arranged at an angle of less than 180° relative to the power arm of the viz. that portion provided with a foot pad portion. This arrangement facilitates the use of a clevis and adjacent zone of a brake operating cable in a substantially vertical position whereby curvature of the cable sheath is reduced and friction lessened with a consequent reduction in the amount of force required to set the brakes.

It is apparent that, within the scope of the invention, modifications and different arrangements may be made other than is herein disclosed, and the present disclosure is illustrative merely, the invention comprehending all variations thereof.

I claim:

1. A device of the character disclosed, in combination, a support having a uniplanar portion, a foot operated lever fulcrumed upon the uniplanar portion of the support, a foot pad secured to the lever, said support being formed with a laterally offset portion, an arcuately shaped arm connected with said offset portion, said lever having a portion straddling said arm, detent means associated with the lever and engageable with the arm for retaining the lever in adjusted positions, means for connecting the lever with mechanism to be operated, a control member for the detent means pivotally supported for movement relative to the lever, said control member having a foot pad portion laterally offset from the lever, and resilient means normally biasing the detent means toward lever retaining position.

2. A device of the character disclosed, in combination, a support having a uniplanar portion, a foot operated lever fulcrumed upon the uniplanar portion of the support, a foot pad secured to the lever, said support being formed with a laterally offset portion, an arm connected with said offset portion, detent means associated with the lever and engageable with the arm for retaining the lever in adjusted positions, means for connecting the lever with mechanism to be operated, a control member for the detent means pivotally supported for movement relative to the lever, said control member being arranged for foot operation, and resilient means normally biasing the detent means toward lever retaining position.

3. Mechanism for controlling braking means of a vehicle, in combination, a support, a foot operated lever disposed at one side of the support and pivotally connected thereto, a foot pad secured to the lever, said lever being formed with a roller engaging surface, said support having a laterally extending portion, an arcuately shaped bar connected with said portion of the support, a roller associated with the lever and arranged for engagement with the bar and surface for retaining the lever in brake setting positions, a member pivoted on said lever and engageable with the roller, a foot operated element connected with said member and arranged for pivotal movement relative to said lever for controlling said roller, and means normally biasing the roller toward lever retaining position.

4. In a brake control mechanism, a support, a first foot operated lever fulcrumed on said support and having a foot pad portion at a depending extremity, lock means at the opposite ends of said lever including a bar pivotally mounted on said support and a pair of abutments disposed at opposite sides of said bar and engageable therewith for holding said lever in brake applied position, one of said abutments cooperatively engaging a wedge surface on said lever to effect wedging engagement of said abutments with said bar, the other of said abutments being supported stationarily on said lever and forming a pivot axis for a lock releasing member pivotally carried on said other abutment, said lock releasing member supporting said one abutment for movement thereof relative to said wedge surface to effect release of said bar from between said abutments, and a second foot operated lever fulcrumed on said support and extending generally parallel with said first lever and having a foot pad portion at a depending end extremity in substantially the same plane as said foot pad of said first lever, the opposite end of said second lever engaging said release member to pivot the same to move the abutment carried thereby away from said wedge surface and effect thereby release of said bar on movement of the second lever relative to the first lever.

5. In a brake control mechanism, a support, a first foot operated lever fulcrumed on said support and having a foot pad portion at a depending extremity, the opposite end of said lever being bifurcated and having lock means including a bar pivotally mounted on said support and a pair of abutments one of which is stationary with said lever and the other of which is movably disposed at opposite sides of said bar and engageable therewith for holding said first lever in brake applied position, the movable abutment cooperatively engaging a wedge surface on said lever to effect wedging engagement of said abutments with said bar, a lock releasing member pivotally supported on said lever on an axis common with said stationary abutment and supporting said movable abutment for movement thereof relative to said wedge surface, and a second foot operated lever fulcrumed on said support and extending generally parallel with said first lever and having a foot pad portion at a depending end extremity in substantially the same plane as said foot pad of said first lever, the opposite end of said second lever being substantially shorter than said depending end and engaging said release member to pivot the same to move the abutment carried thereby away from said wedge surface and effect thereby release of said bar on movement of the second lever relative to the first lever.

6. In a brake control mechanism, a support, a first foot operated lever fulcrumed on said support and having a foot pad portion at a depending extremity, said lever having the opposite end bifurcated, lock means at the said opposite end of said lever including a bar pivotally mounted on said support extending between the bifurcated end of said lever and a pair of abutments one of which is stationarily carried on said lever and the other of which is movable and disposed at opposite sides of said bar and engageable at any point throughout the movement along said bar for holding said lever in brake applied position, said abutments being disposed within the bifurcated end of said lever, a substantially U shaped lock releasing member straddling the bifurcated end of said lever and pivoted on said lever, said lock releasing member supporting said movable abutment for movement thereof relative to said wedge surface and relative to said stationary abutment, and a second foot operated lever carried on the fulcrum of the first lever and extending generally parallel with said first lever and having a foot pad portion at a depending end extremity, the opposite end of said second lever engaging said release member to pivot the same to move said movable abutment carried thereby away from said wedge surface and effect lock release of said bar on movement of the second lever relative to said first lever.

References Cited in the file of this patent

UNITED STATES PATENTS

| | | |
|---|---|---|
| 1,321,615 | Friddle | Nov. 11, 1919 |
| 2,014,300 | Strobridge | Sept. 10, 1935 |
| 2,018,305 | Hoysradt | Oct. 22, 1935 |
| 2,233,329 | Sprink | Feb. 25, 1941 |
| 2,308,898 | Skareen | Jan. 19, 1943 |
| 2,309,454 | Heller | Jan. 26, 1943 |
| 2,315,704 | Hoch | Apr. 6, 1943 |
| 2,465,804 | Hendricksen et al. | Mar. 29, 1949 |
| 2,587,725 | Hinsey | Mar. 4, 1952 |
| 2,722,847 | Petrochko | Nov. 8, 1955 |
| 2,817,420 | Ulinski | Dec. 24, 1957 |
| 2,872,830 | Hinsey | Feb. 10, 1959 |
| 2,875,641 | Powell | Mar. 3, 1959 |